United States Patent [19]
Kamamoto et al.

[11] Patent Number: 5,982,429
[45] Date of Patent: Nov. 9, 1999

[54] VIDEO CAMERA WITH EYEPIECE AND LARGE LCD VIEW FINDERS

[75] Inventors: Yoji Kamamoto, Chiba; Masahiro Sunayama, Gifu; Masayasu Kaneko, Ibaragi; Tsutomu Mikami, Saitama; Shoichi Shibata, Kanagawa, all of Japan

[73] Assignee: Sony Corporation, Tokyo, Japan

[21] Appl. No.: 08/490,043

[22] Filed: Jun. 13, 1995

[30] Foreign Application Priority Data

Jun. 22, 1994 [JP] Japan .................................... 6-140031

[51] Int. Cl.⁶ ...................................................... H04N 5/225
[52] U.S. Cl. ............................................. 348/333; 348/373
[58] Field of Search ..................................... 348/207, 335, 348/341, 333, 334; 396/373, 374, 378, 383, 386; 345/1, 2, 3, 5; 358/906, 909.1; H04N 5/225

[56] References Cited

U.S. PATENT DOCUMENTS

| | | | |
|---|---|---|---|
| 4,757,388 | 7/1988 | Someya et al. | 348/333 |
| 5,119,203 | 6/1992 | Hosaka et al. | |
| 5,258,844 | 11/1993 | Nakayama et al. | |
| 5,442,453 | 8/1995 | Tagaki et al. | 348/374 |
| 5,539,463 | 7/1996 | Morikawa et al. | 348/375 |

FOREIGN PATENT DOCUMENTS

| | | | |
|---|---|---|---|
| 3918279A1 | 12/1990 | Germany | H04N 5/225 |
| 61-150474 | 7/1986 | Japan | H04N 5/225 |
| 1-246968 | 10/1989 | Japan | H04N 5/225 |
| 03053771 | 3/1991 | Japan . | |
| 5-336415 | 12/1993 | Japan | H04N 5/225 |
| 61-69418 | 6/1994 | Japan | H04N 5/225 |
| 63099677 | 4/1998 | Japan . | |

OTHER PUBLICATIONS

Sony Video Camera Recorder, Operation Manual, (CCD–FX730V), 1994 by Sony Corporation, 1994.

*Primary Examiner*—Tuan Ho
*Attorney, Agent, or Firm*—Ronald P. Kananen; Rader, Fishman & Grauer PLLC

[57] ABSTRACT

A video camera is provided with both a liquid crystal display as well as a smaller conventional eyepiece type viewfinder. Switching means responsive to an opening movement of the liquid crystal display from a closed position are used to automatically and smoothly switch off the viewfinder, switch on the liquid crystal display and to enable a speaker. The liquid crystal display is also used as a cover for relatively infrequently used setting switches and controls.

19 Claims, 15 Drawing Sheets

FIG.18

| SW | off | on |
|---|---|---|
| Q1 | off | on |
| Q2 | off | on |
| Q3 | on | off |
| Q4 | off | on |
| Q5 | off | on |
| LCD | on | off |
| EVF | off | on |
| Speaker | on | off |

VIDEO CAMERA WITH EYEPIECE AND LARGE LCD VIEW FINDERS

FIELD OF THE INVENTION

The present invention relates to a portable video camera provided with an insertable video tape for recording and reproducing an images. More specifically, the present invention relates to a portable video camera which has a liquid crystal display screen provided in addition to a conventional viewfinder arrangement.

DETAILED DESCRIPTION OF THE INVENTION

Conventional video cameras are usually provided with either an optical type viewfinder OVF or an electronic type viewfinder EVF for adjusting a focal length to an object and for focussing on a desired object in an image field range.

With an EVF type of viewfinder, it is possible both to focus on an object and to view the reproduction of what has thus far been recorded during playback.

It is also known to use a large scale liquid crystal display device (hereinafter referred to as an "LCD") instead of the smaller conventional "eyepiece" type viewfinder. In this case, the image of the object or the reproduced image recorded on the video tape is displayed on the LCD making it possible to focus the camera on the desired object or scene or enjoy reviewing the already recorded image(s) after the recording operation. This arrangement also enables a number of people to simultaneously watch the image and facilitates the ease with the playback can be reviewed.

However, both of these arrangements suffer from a number of drawbacks. In the case of the small eyepiece type viewfinder, because it is necessary to locate the object or image while viewing through the view finder, the field of view is limited and gives rise to the problem that important subject matter may be missed because the camera operator was unaware of his or her surroundings, or the camera could not be physically moved fast enough to catch up with a fast moving object or the like. That is to say, it is often necessary for the camera operator to separate his or her eye from the view finder to confirm the position of the object and then again attempt to sight the object through the viewfinder.

Further, with this small eyepiece type of viewfinder, only one person can review the recorded material at a time and it is necessary, if a number of people wish to simultaneously review the recording playback, that the camera be connected to another discrete compact monitor or television set. This is of course troublesome and time-consuming.

In the case of the larger LCD type display, however, electric power consumption is larger than that of the eyepiece type. Accordingly, as battery capacity is limited and the time between charging operations is short, this type of system is rendered unsuitable for situations wherein prolonged operation is required.

Furthermore, since the LCD is fixed to the exterior of the video camera, visual clarity tends to be attenuated by strong external ambient light such as daylight or sunshine. In particular, the image may be barely visible when sunshine or other bright light impinges on the LCD.

Thus, as will be appreciated, these types of conventional video cameras encounter drawbacks caused by the narrow view field inherent with the eyepiece type view finder, and large electric power consumption with poor visual clarity in bright sunshine and the like in the case of the larger LCD type displays.

SUMMARY OF THE INVENTION

An object of the present invention is to solve the above-noted problems by providing a video camera which includes a liquid crystal display in addition to an eyepiece type viewfinder.

The above-described liquid crystal display may be selectively used to display either the image of the object being photographed or the reproduced image recorded on a video tape and is pivotally mounted on the video camera body through an opening/closing means. A display portion of the liquid crystal display is recessed back from a front surface of the liquid crystal display. The video camera is provided with a switching means which allows the image to be displayed on either the liquid crystal display or the view finder. The switching means is operatively interposed between the opening/closing means and the video camera body. The liquid crystal display is arranged to open through an angle of 130°±5° about an axis of the opening/closing means. The liquid crystal display is also rotatable in a direction perpendicular to the axis of the opening/closing means by a rotating means interposed between the liquid crystal display and the opening/closing means. The rotating means is rotatable in either the clockwise or counterclockwise directions through an angle of 90°, respectively, when the liquid crystal display is opened. The rotating means is provided with a click or detent "click" function for producing a detent feeling when the liquid crystal display is rotated in the direction perpendicular to the axis of the opening/closing means.

A group of switches which are used to set the various operation parameters of the camera are arranged to project out at a location whereat the liquid crystal display is mounted on a side surface of the video camera body and against which the liquid crystal display can be closed. A speaker for reproducing an audio signal is arranged on a side surface of the video camera body either at or proximate to the location against which the liquid crystal display is closed. The speaker is rendered operative by the switching means to output only sound when the liquid crystal display is open and in use.

A damage-proof or protective treatment is provided close to the opening/closing means on a side surface of the video camera body to which the liquid crystal display is closed. The damage-proof treatment includes a group of projections which are arranged in a predetermined manner. A locking means for maintaining the liquid crystal display in a closed condition is provided between the video camera body and the openable/closable liquid crystal display.

In the video camera according to the present invention, it is possible to switch between the view finder and the liquid crystal display as desired. It is therefore possible to easily select which is best suited for the situation and therefore increase the utility of the camera. Also, since the liquid crystal display can be closed against the video camera body it is possible to use the camera comfortably in a completely conventional manner without any distraction due to the visible presence of a large LCD.

Since the view finder and the liquid crystal display are automatically switched by the opening and closing of the LCD display, switching is quick and simple and also reduces power consumption.

Further, since the switching means is interposed between the video camera body and the opening/closing means, the chances of a malfunction of the switching means is greatly attenuated. As long as there is no intention of opening the liquid crystal display, the switching of the image displays does not occur and stable operation is assured.

Since the actual display portion of the liquid crystal display is recessed back from the face of the liquid crystal display, the display portion does not come into contact with the side surface of the video camera body when it is closed, thus ensuring that the display portion is protected against a degradation or loss of quality.

Moreover, since the liquid crystal display is opened in the range of 130°±5° about the axis of the opening/closing means, many people can simultaneously view the display portion of the liquid crystal display.

Furthermore, since the liquid crystal display is rotatable in the direction perpendicular to the axis of the opening/closing means by the rotating means, it is possible to rotate the liquid crystal display to an easy-to-view position during the reproduction or playback mode, and also to facilitate the taking of low and high angle shots. Since the liquid crystal display is rotatable through an angle of about 90° in either of the clockwise direction or counterclockwise direction, it is possible to view the display image field over a wide range.

Further, when the liquid crystal display is rotated at a maximum level in the direction perpendicular to the axis of the opening/closing means, in order to prevent the body of the liquid crystal display from accidental collision with the video camera body, the opening angle is set at the above-mentioned 130°±5° range.

With the click function provided by the rotating means, the rotational position of the liquid crystal display is clarified to improve the stability of the handling and the operational feel.

The setting switch group (for example, switches such as DATE, COUNTER RESET, MENU SETTING, SPEAKER VOLUME) is arranged on the side surface of the video camera body to which the liquid crystal display is closed, whereby it is not exposed and there is no fear that the setting would be changed by accidental contact with the switch group when the eyepiece viewfinder is in use.

With the speaker, it is possible to simultaneously enjoy sound with the speaker during reproduction modes wherein the liquid crystal display is open and in use, and wherein the automatic switching is conveniently effected to enhance the operationability.

Even if a part of the body of the liquid crystal display which is opened and closed by a damage-proof treatment, i.e., the projection group provided on the side surface of the video camera body which is covered by the liquid crystal display when it is closed, is brought into contact with the above-described side surface, scratches or the like type of damage are not pronounced and the quality of the device may be maintained. Furthermore, the projection group also serves to prevent possible slippage of the hand which grips the video camera during a pickup mode wherein the liquid crystal display is in use.

When the liquid crystal display is closed against the video camera body side, a lock means ensures that the closed condition is maintained and prevents accidental opening.

BRIEF DESCRIPTION OF THE DRAWINGS

The invention disclosed herein will become better understood as a detailed description is made of the preferred embodiments with reference to the appended drawings in which:

FIG. 18 is a truth table showing the relationship between the ON and OFF conditions of the various elements which comprise the circuit shown in FIG. 17.

DETAILED DESCRIPTION OF THE PREFERRED EMBODIMENTS

Figure 1:
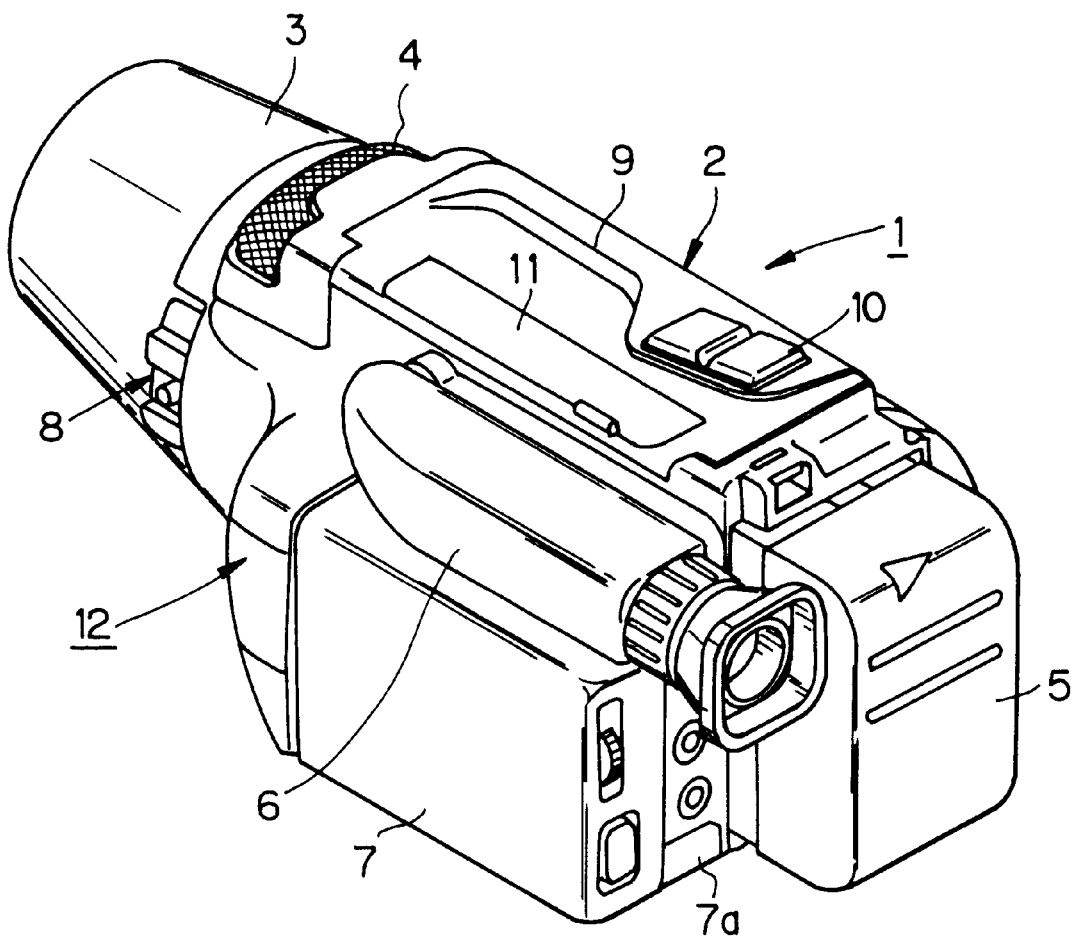
FIG. 1 is a perspective view showing an embodiment of the invention wherein the liquid crystal display is closed against the body of a video camera.

An embodiment of a video camera according to the present invention will now be described with reference to the accompanying drawings. The video camera 1 is essentially composed, as shown in FIG. 1, of a video camera body 2 for recording and reproducing an image or scene on a video tape operatively disposed within; a lens portion 3 provided on a front side of the body 2; a sound collection microphone 4; a battery 5 detachably mounted on a rear portion of the body 2; a pivotally mounted EVF (eyepiece-type view finder) 6 for viewing the image being picked up and for also displaying the image reproduced from the video tape to a viewer who is viewing through the viewfinder, and a large scale color liquid crystal display device 7 provided on one side of the body 2.

The arrangement further includes a power switch 8 for switching between a pick-up mode and a playback mode and for turning off a power source, provided on an outer periphery of the lens portion 3. A loading cover 9 which is provided over a loading opening in an upper portion of the body 2 for concealing a video tape which is loaded into the video camera. A zoom switch 10 and a playback control cover 11 which can be opened to permit operation of various buttons which control video tape playback, are provided on the loading cover 9.

A large scale color liquid crystal display device (hereinafter simply referred to as LCD) 7 for selectively displaying either the image being recorded or the image which is being reproduced from the video tape, is provided on the body 2 of the video camera 1 in addition to the EVF 6. The LCD 7 is pivotally mounted through an opening/closing device 12 which serves as an opening/closing means.

Figure 2:
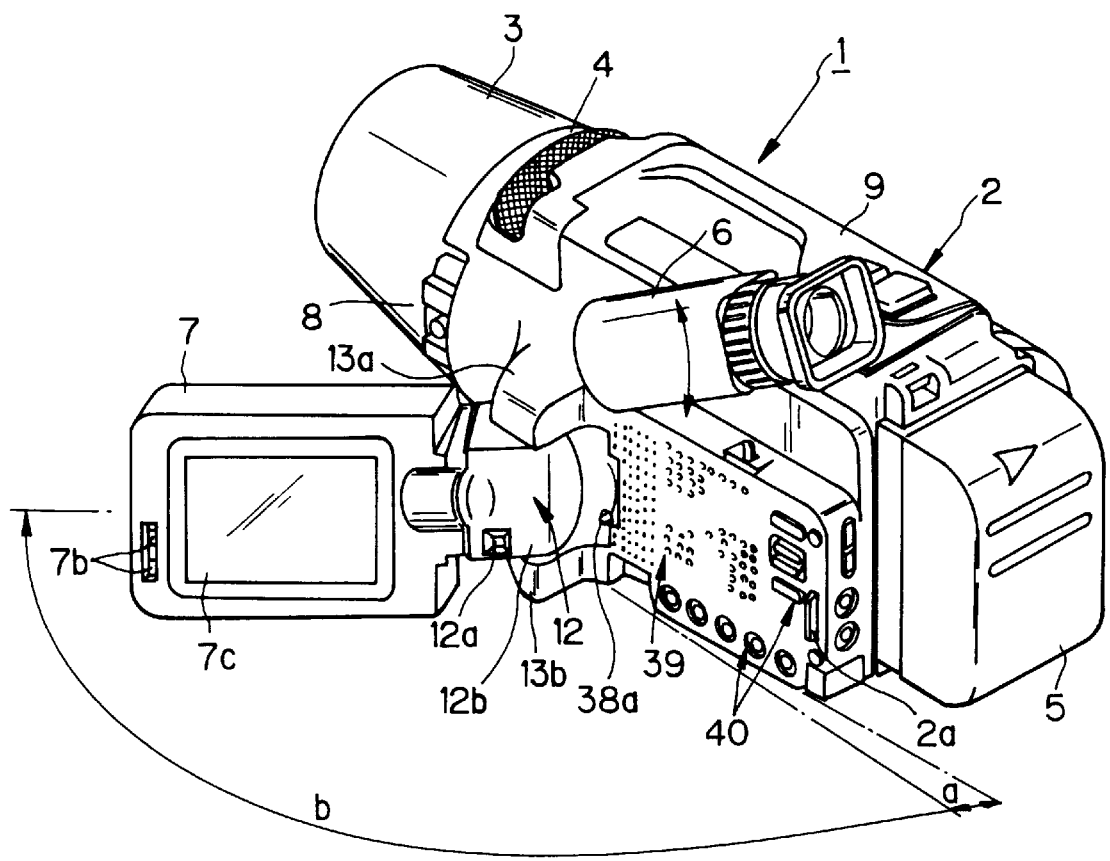
FIG. 2 is a perspective view showing the embodiment of the invention with the liquid crystal display maximally opened and with the view finder rotated obliquely.
Figure 3:
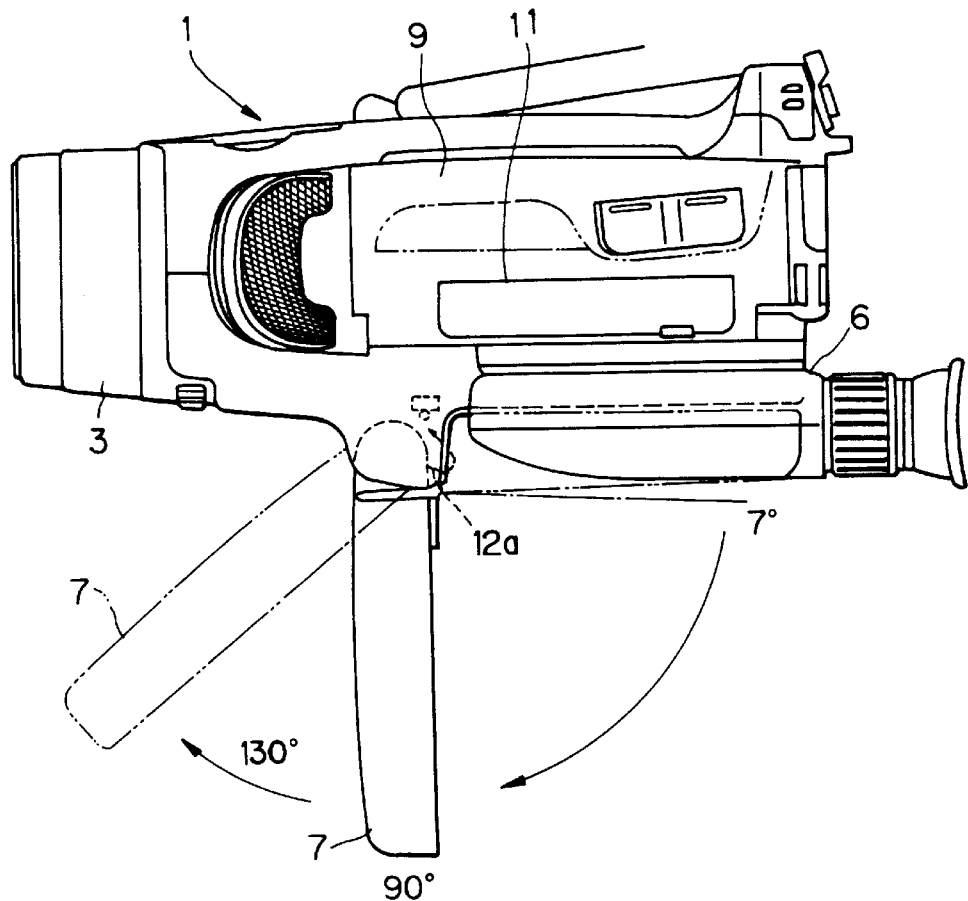
FIG. 3 is a plan view showing the condition wherein the liquid crystal display of the video camera is opened to 90°.
Figure 4:
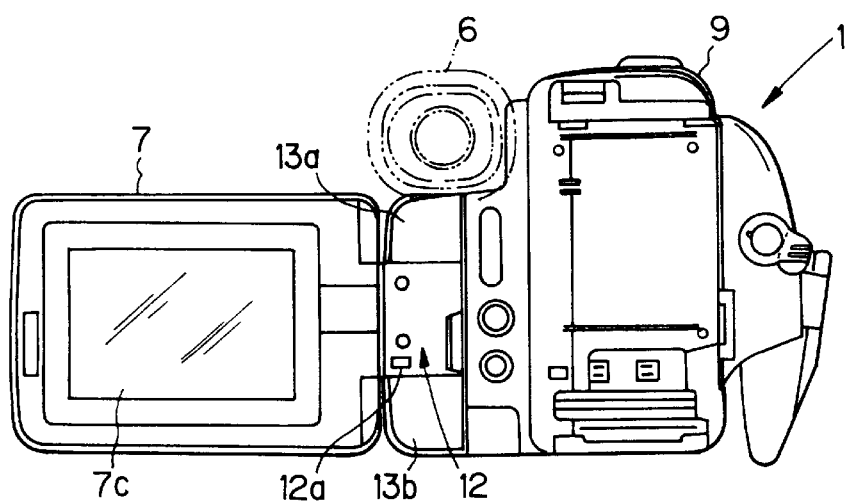
FIG. 4 is a rear elevational view of the arrangement illustrated in FIG. 3.

The opened and closed states of the LCD 7 are shown in FIGS. 2 to 4. Namely, the opening/closing device 12 is such as to pivot about bearing portions 13a and 13b provided at upper and lower portions of a one-side surface of the body 2 and is structured so as to be rotatable in a horizontal direction in the range of 0° to 130° (±5°) from the side of the camera body 2. The LCD 7 is supported on and fixed to the opening/closing device 12 in a manner which enables it be opened and closed relative to the body 2.

The LCD 7 is released and opened by lightly holding the LCD 7 with one hand and depressing a lock release button 7a provided on the LCD 7 side.

A lock mechanism which is operated by the lock release button 7a, includes an engagement claw 7b which is spring-biased toward an inner surface of the LCD 7, and an engagement portion 2a provided with a recess (not shown) with which an end portion of the engagement claw 7b is engageable. This recess is arranged at a position corresponding to the engagement claw 7b on the side of the body.

When the lock release button 7a is depressed, the engagement claw 7b is displaced against the biasing force, and the end portion of the engagement claw 7b is released from the engagement portion 2a.

When the LCD 7 is closed against the body 2, a image display surface 7c forming a display portion of the LCD 7 is brought into abutment with the one-side surface of the body 2. In this case, in order to prevent the image display surface 7c from being damaged or scratched, the image display surface 7c is recessed by a small amount back away from the front surface of the LCD 7.

Figure 5:
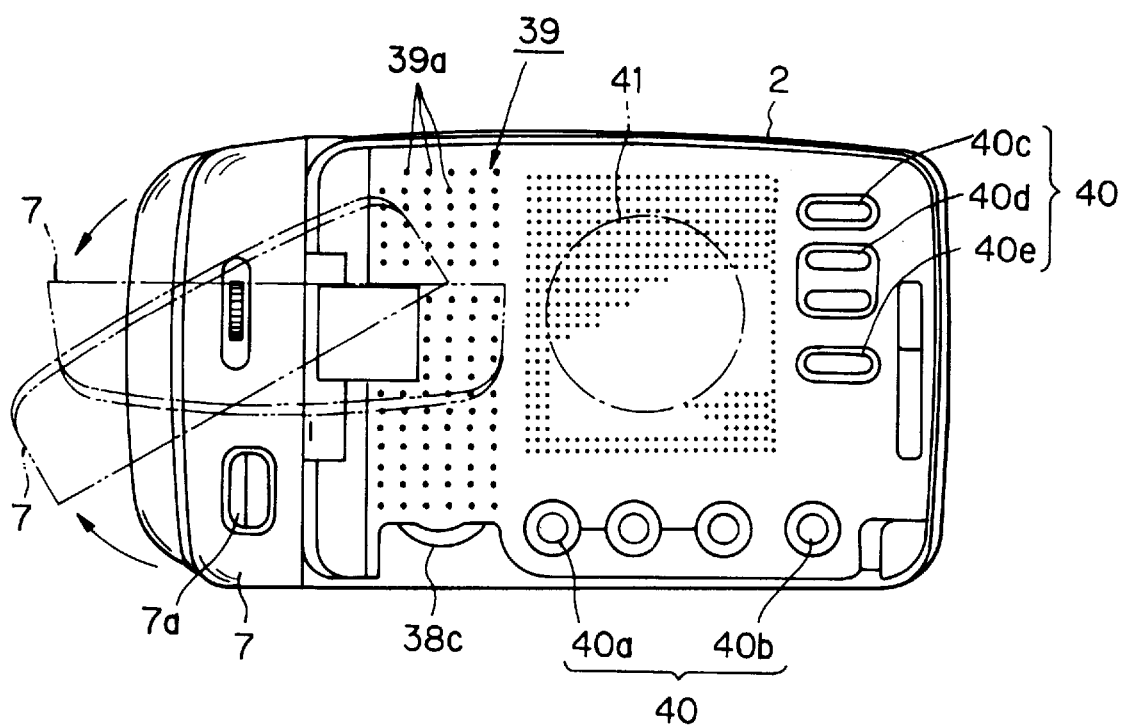
FIG. 5 is a side elevational view showing the liquid crystal display rotated to a tilted orientation, and showing the arrangement of a setting switch group and the location of a speaker.

Furthermore, not only is the LCD 7 openable relative to the body 2 but also, as shown in FIGS. 3 through 5, under the condition that the LCD 7 is released from the one-side surface of the body 2, the LCD 7 is rotatable in a clockwise direction and in a counterclockwise direction by about 90° about a horizontal axis 14 perpendicular to a vertical axis which defines the rotational center of the opening/closing device 12. Namely, the LCD 7 may be both pivoted and rotated relative to the body 2.

Examples of an opening/closing mechanism and a tilt mechanism for performing the opening/closing effect and the tilt effect of the LCD 7 will be explained with reference to FIGS. 6 to 13.

The opening/closing mechanism is composed of an opening/closing device 12 and is shown in FIGS. 6 to 10. Support members 15a and 15b which are arranged one above the other on one side surface of an outer shell and which are made of synthetic resin, are fixed in place by screws on a side of the video camera body 2.

Holes 15c and 15d, through which a shaft 16 passes, are formed in arm portions which extend horizontally from the support members 15a and 15b.

An L-shaped leaf spring 17, made of stainless steel, having a clicking projection 17b which serves as a positioning click when the rotary shaft 16 is rotated, is fixed to the support member 15a by a screw.

In order to provide contact smoothly between a rotary positioning plate 18 to be rotated together with the shaft 16, and the body portion of the leaf spring 17, the leaf spring 17 is formed with a slant portion 17a which extends laterally from the body portion and is bent slightly upwardly. The clicking projection 17b projects downwardly at a predetermined position of the body portion of the leaf spring 17.

Figure 7:
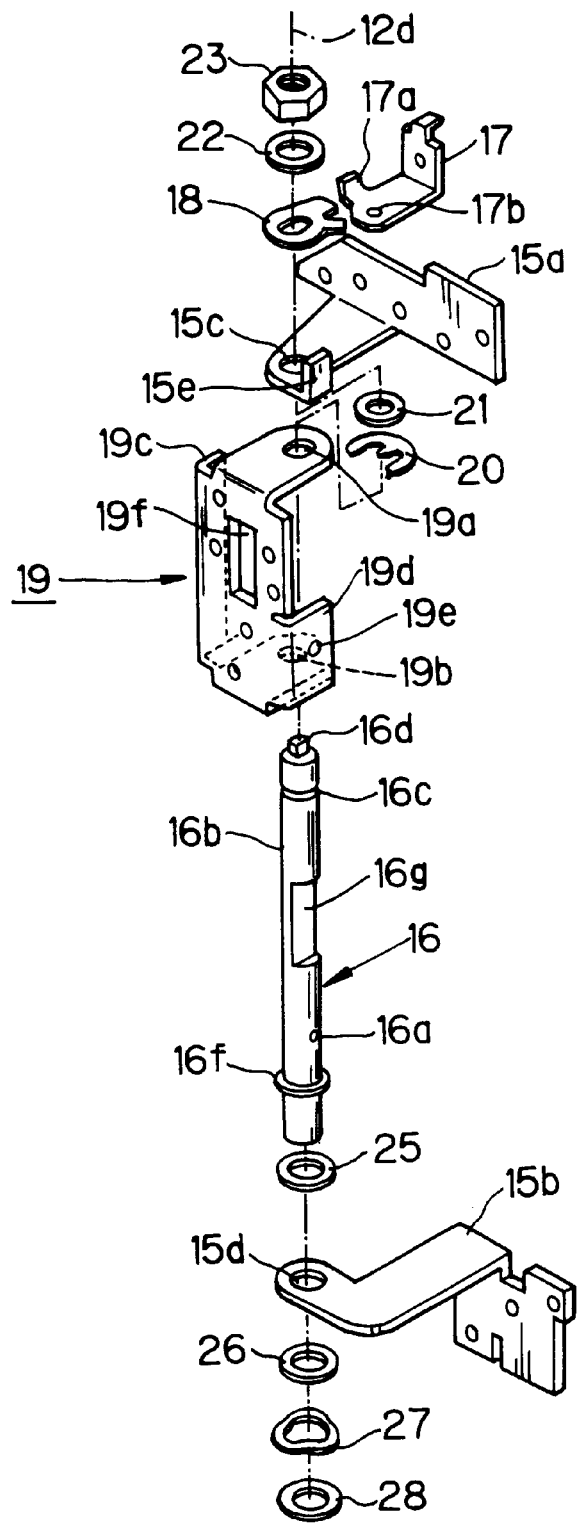
FIG. 7 is an exploded perspective view showing one of the components of the opening/closing device shown in FIG. 6.

As shown in FIG. 7, a rotary member 19, which is supported by the support members 15a and 15b and the shaft 16, is generally formed into a U-shape and is provided with through-holes 19a and 19b through which the shaft 16 is disposed. As will be appreciated, both arm portions extend horizontally, respectively, from upper and lower end portions of a vertical planar portion of the rotary member 19.

Furthermore, a shaft engagement portion 19c and a cover mount portion 19d extend horizontally from right and left end portions of the vertical planar portion.

A rectangular window 19f is formed longitudinally in the vertical planar portion. A lead line for transmitting electric signals of a picked-up image or a reproduced image from the print substrate on the body 2 side to the print board of the LCD 7 is inserted through the window.

Figure 8:
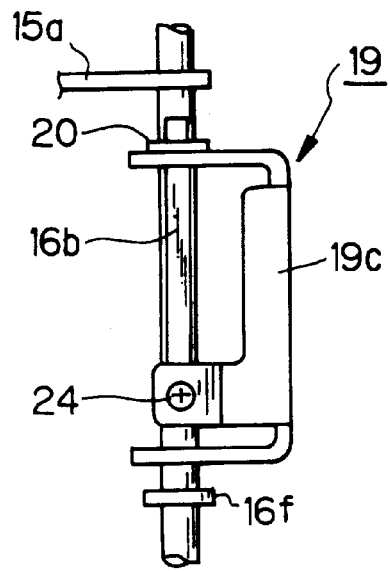
FIG. 8 is an elevational view showing a part of the opening/closing mechanism.

The through-holes 19a and 19b of the rotary member 19 are not exactly round but have a linear or flat part in each circumference. As shown In FIG. 8, the through-holes are formed so as to engage with the shaft 16 which has been cut so as to have a flat planar portion 16b with the same cross-section as the shape of the through-holes 19a, 19b.

Figure 6:
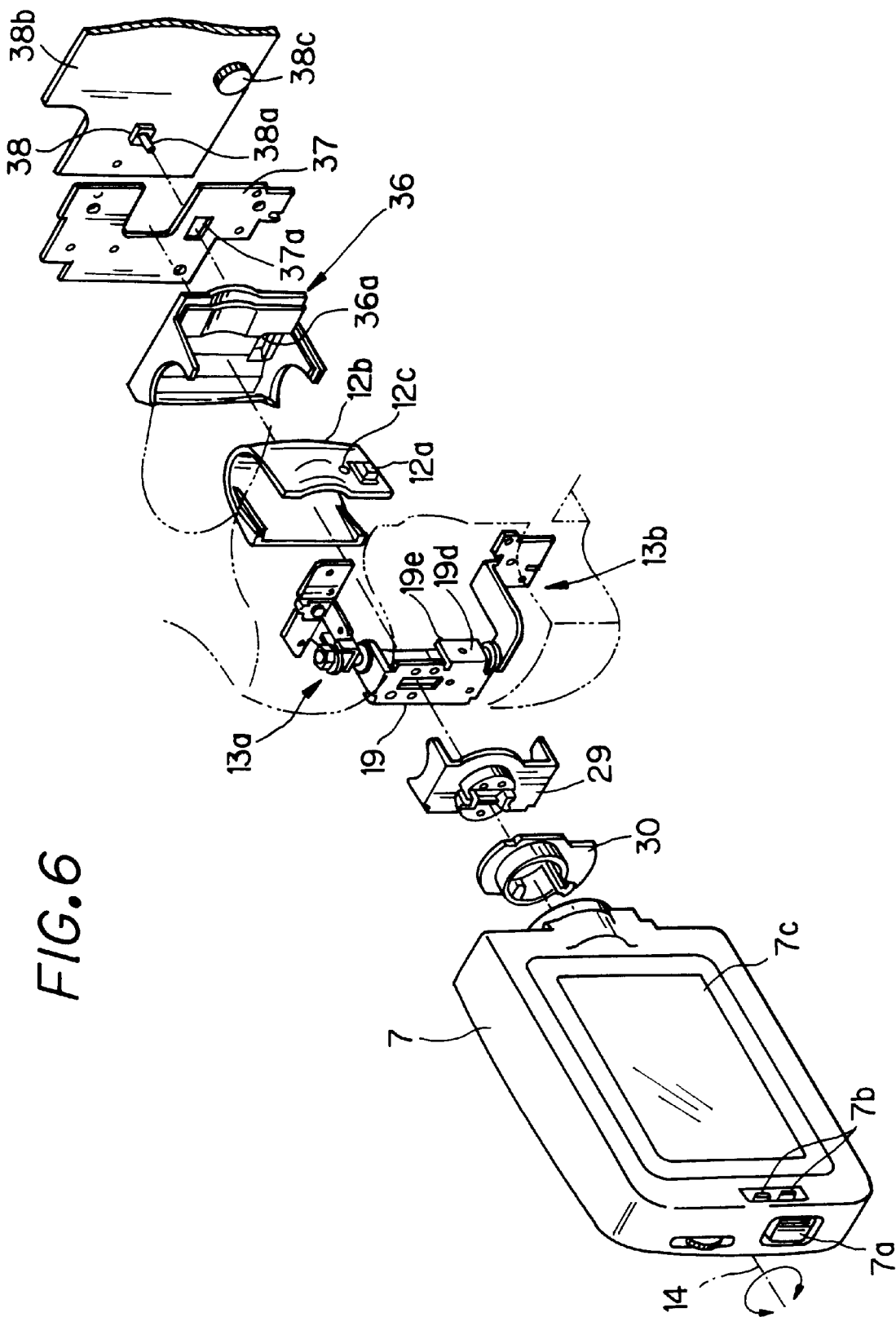
FIG. 6 is an exploded perspective view showing components of a mechanism which provides the opening/closing function and tilt function of the liquid crystal display in accordance with the present invention.

A screw hole 19e is provided at a predetermined position in the cover mount portion 19d and, as shown in FIG. 6, the screw hole 19e is aligned with the mount hole 12c in a cover 12b which is provided with a push button-like projection 12a. The cover 12b is fixed to the rotary member 19 through the cover mount portion 19d by a screw.

The planar portion 16b is formed by cutting the outer circumferential surface thereof at a predetermined position in the vertical direction in the above-described shaft 16. An end portion of the shaft engagement portion 19c is fixed by a screw to the planar portion 16b.

Figure 11:
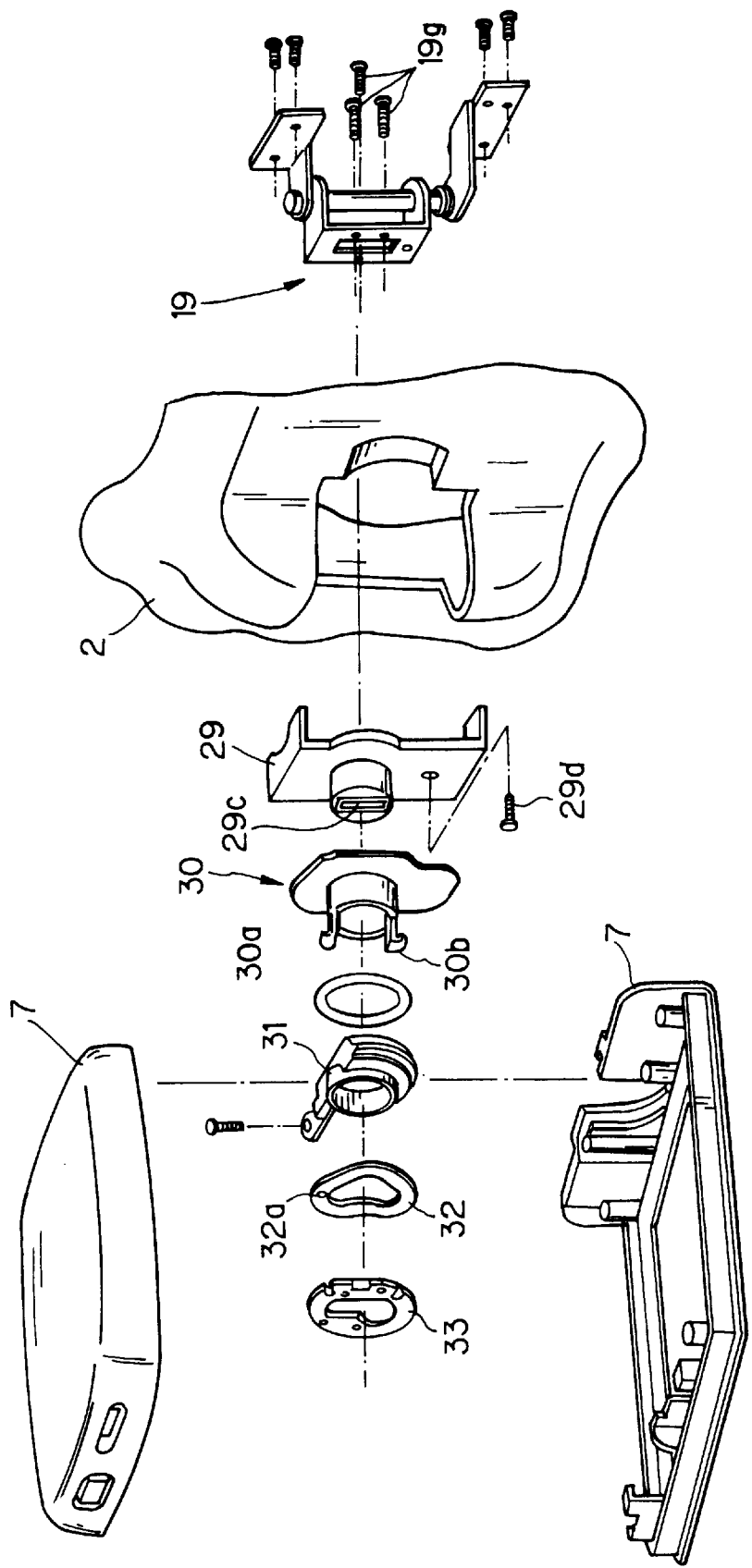
FIG. 11 is a perspective view showing the tilt mechanism which enables rotation of the liquid crystal display in a direction perpendicular to an axis of the opening/closing mechanism.
Figure 12:
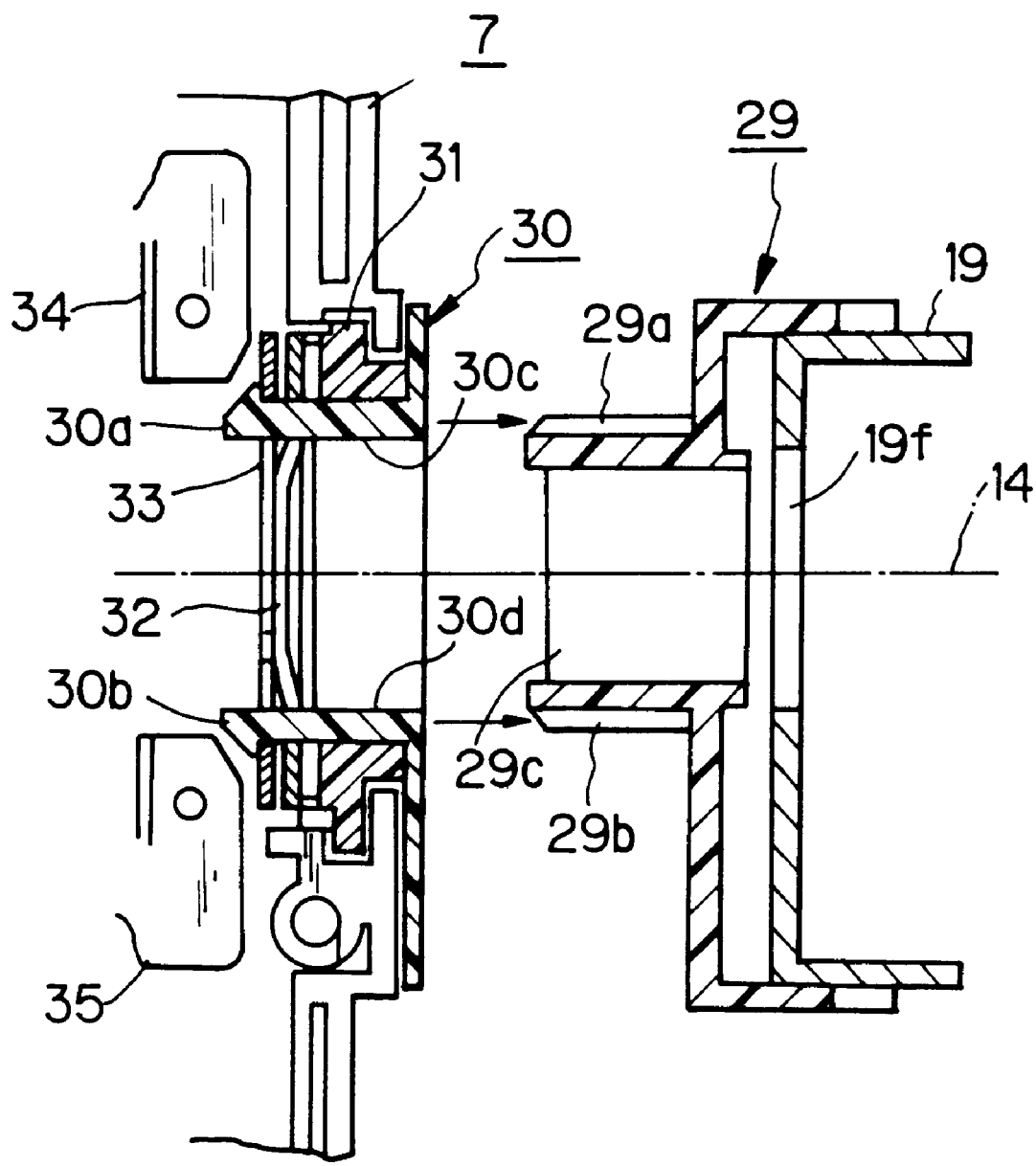
FIG. 12 is a partially disassembled longitudinal sectional view of the tilt mechanism.

A cutaway portion 16g is formed for providing a space for the lead line of the LCD 7 and for further facilitating work with a screw-driver when the LCD 7 is fixed to the rotary member 7 by screws 19g as shown in FIG. 11.

The shaft 16 is inserted into the through-holes 19a and 19b of the rotary member 19 with the hole shape being aligned with the linear portion thereof.

A removal preventing stop or C-ring 20 is engaged in a circumferential groove 16c located above an upper end face of the through-hole 19a and is mounted to the rotary shaft 19.

As shown in FIG. 8, the end portion of the shaft engagement portion 19c is fixed by a screw 24 to the screw hole 16a provided at the lower portion of the planar portion 16b of the shaft 16. Thus, the rotary member 19 and the shaft 19 rotate together about the axis 12d. A spacer 21, the arm portion of the support member 15a, a rotational positioning plate 18 and a washer 22 are mounted in that order from the upper side onto a portion of the shaft 16 above the circumferential groove 16c. A nut 23 is fastened to a screw portion 16d of the end portion.

Figure 9:
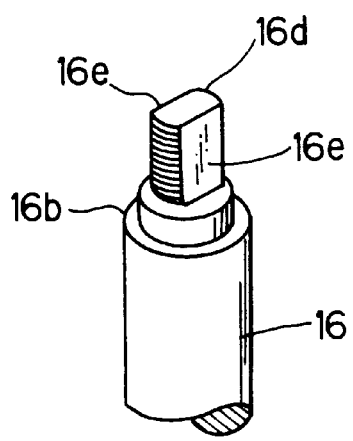
FIG. 9 is an illustration of an upper shape of a shaft used in the opening/closing mechanism.

As shown in FIG. 9, the screw portion 16d of the shaft 16 is formed by cutting both sides of the circular shape along surfaces 16e in parallel to a planar portion 16b. A through-hole 18a of the rotational positioning plate 18 has the shape which matches the cross-section of the screw portion 16d. The shaft 16 and the rotational positioning plate 18 rotate together.

Figure 10A:
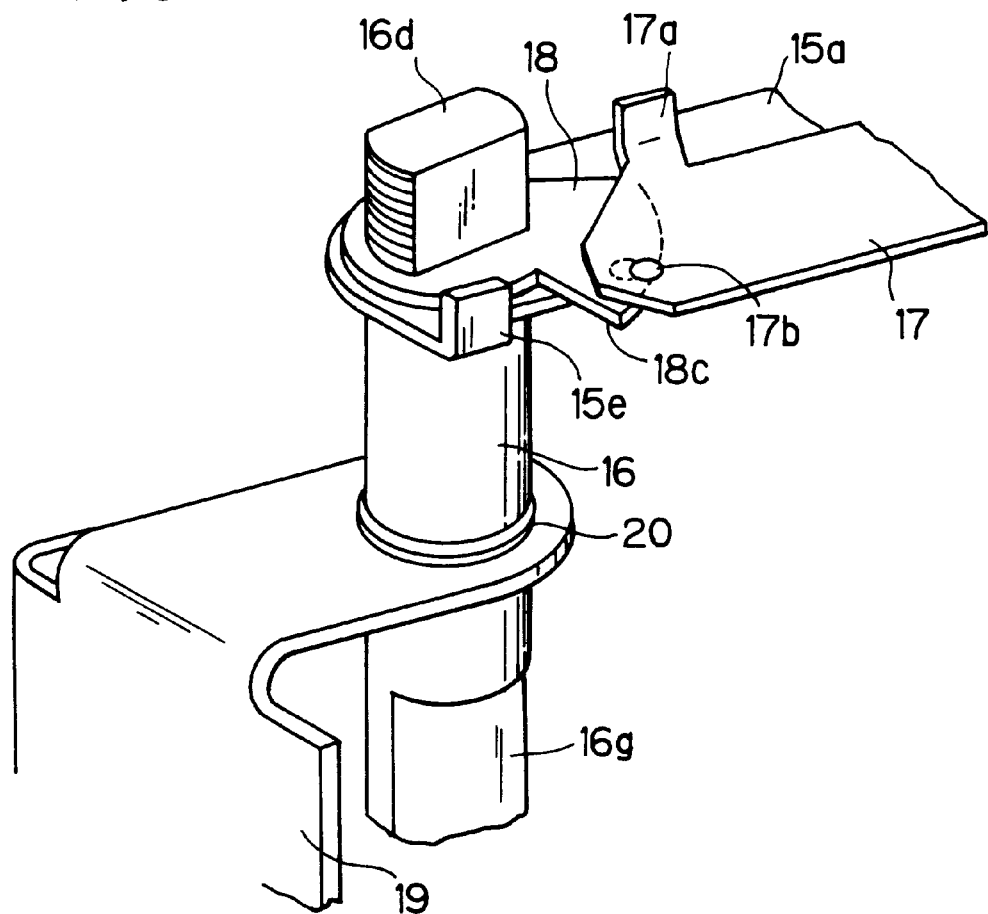
FIG. 10A is an enlarged perspective view of an assembled part of an upper portion of the opening/closing mechanism.
Figure 10B:
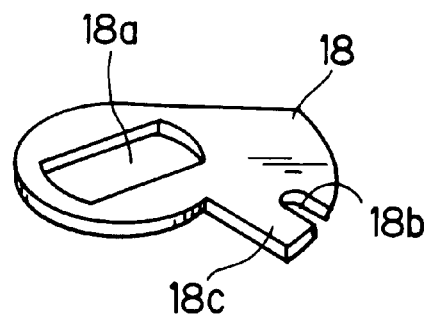
FIG. 10B is a perspective view showing one of the elements shown in FIG. 10A.

As shown in FIGS. 10A and 10B, when the rotary member 19 and the shaft 16 are rotated together at an opening angle 90° from a closed condition of the LCD 7 to an open condition, the rotational positioning plate 18 is also rotated. The projection 17b of the leaf spring 17 which has been held in sliding contact with the upper surface of the plate 18 reaches the cutaway portion 18b and drops down under the spring force. The change in load imparts a click feeling to the operator.

Furthermore, the rotary member 19 and the shaft 16 are rotated in the open direction of the LCD 7 so that the LCD 7 may be maintained open at about 130°. Following this, the rotational positioning plate 18 is rotated in the same direction together with the shaft 16 and the projection 17b is pulled away from the cutaway portion 18b and moves into sliding contact with the upper surface. A side end face 18c of the rotational positioning plate 18 is brought into contact with one side surface of a stopper 15e fixed to a predetermined position so that the rotational positioning plate 18, the shaft 16 and the rotary member 19 are prevented from rotating and thus limit the opening of the LCD 7.

A flange 16f is provided at a lower portion of the shaft 16. A washer 25, the support member 15b, a washer 26, a corrugated washer 27 and a seat 28 are engaged in that order on the lower side of the flange. The lower end portion of the shaft 16 is press fitted to mount these components.

Thus, the opening/closing device 12 is constructed in a manner to permit opening the LCD 7 from one side surface of the body 2. The rotary member 19 and the LCD 7 mounted on the rotary member 19 are openable/closable in the range of 130°±5° relative to the one side surface of the video camera body 2.

A mechanism for tilting the LCD 7 about the axis 14 of the LCD 7 which is perpendicular to the axis in the vertical direction of the opening/closing device 12, when the LCD 7 is extended away from the side surface of the video camera body 2, will now be explained with reference to FIGS. 6 and 11 to 13.

A tilt bearing 31 is engaged with two-divided side walls 7 which form the synthetic resin made body of the LCD. The tilt bearing 31 is a member discrete from the side walls and has a cylindrical portion. The tilt bearing 31 is provided with a resilient circular corrugated plate 32 for providing a limited resistance to rotation by applying a torque to a circumferential portion of a tip end portion thereof.

A cylindrical portion of a tilt sleeve 30 is loosely rotatably engaged from an outside into the cylindrical portion of the tilt bearing 31. A circular tilt lock plate 33 having a rectangular hole 33a in the central portion thereof is engaged with engagement portions 30a and 30b projecting on the tip end side of the cylindrical portion of the tilt sleeve 30.

The tilt lock plate 33 causes the corrugated plate 32 to be held at the outer circumferential portion of the tip end portion of the cylindrical portion of the tilt bearing 31, and causes the tilt sleeve 30 to be held for preventing its removal in the horizontal direction relative to the tilt bearing 31 and so that the tilt sleeve 30 must be subjected to a predetermined torque.

Figure 13:
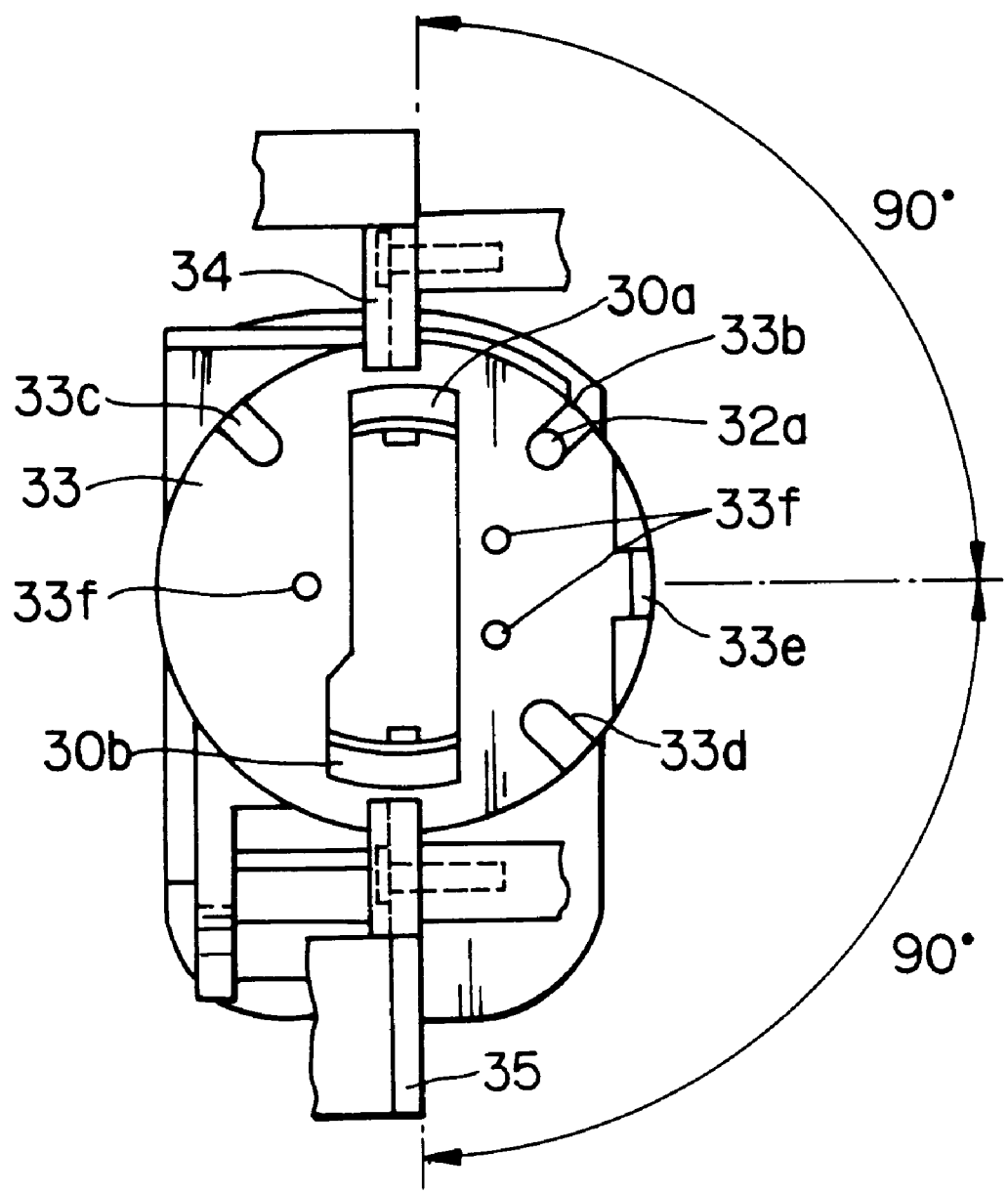
FIG. 13 is a frontal view of the tilt mechanism.

As shown in FIG. 13, cutaway portions 33b, 33c and 33d are provided and furthermore, a stopper 33e raised inwardly toward the LCD 7 is provided on a circumferential portion of the tilt lock plate 33, respectively.

The cutaway portions 33c and 33d are arranged at 90° in the clockwise direction and the counterclockwise direction relative to the cutaway portion 33b.

In the initial position, the projection 32a provided at a predetermined position of the corrugated plate 32 is engaged with the cutaway portion 33b. When the projection 32a is engaged with the cutaway portion 33c, the LCD 7 is rotated through about 90° about the axis 14 in the counterclockwise direction. When the projection 32a is engaged with the cutaway portion 33d, the LCD 7 is rotated through about 90° in the clockwise direction.

Accordingly, when the LCD 7 is rotated through 90° in the clockwise direction or in the counterclockwise direction, positioning stoppers 34 and 35 are also rotated simultaneously therewith about the axis 14 and become engaged with one end face of the stopper 33e, respectively, and thus serve as the positioners for limiting the rotation of the LCD 7. At the same time, a projection 32a on the corrugated plate 32 is such as to engage with the cutaway portions 33b, 33c and 33d and thus impart a "click" sensation to the operator.

In order to mount the LCD 7 having such a tilt mechanism onto the rotary member 19 on the side of the video camera body 2, as shown in FIGS. 6 and 11, a cover 29 made of synthetic resin is first positioned in and fixed by a screw 29d to the rotary member 19 supported by the support members 15a and 15b which are fixed to one side surface of the video camera body 2 as assembled as the opening/closing device 12.

A cylindrical portion, opened at one side and projecting from the vertical planar member in the horizontal direction, is provided in the cover 29. Further, recesses 29a and 29b for guidance are provided at the upper and lower portions of the circumferential wall of the cylindrical portion, and a rectangular window 29c is provided in the middle portion of the wall at the tip end of the cylindrical portion.

The tilt sleeve 30 mounted on the LCD 7 is engaged with the cover 29 under the guidance of the recesses 29a and 29b so that the projections 30c and 30d (parts of the above-described engagement portions 30a and 30b) of the cylindrical portion of the tilt sleeve 30 are engaged.

Elongate screws 19g are inserted into screw insertion holes (at three positions) of the rotary member 19 from the inside of the video camera 2, so that the tip end portion of the screws 19g are inserted into each cylindrical portion of the cover 29 and the tilt sleeve 30 and become engaged with the threads of screw holes 33f of the tilt lock plate 33.

Thus, the tilt sleeve 30 is held to the cover 29 and is mounted on the video camera body 2 and the LCD rotatable through the tilt bearing 31 to the tilt sleeve 30 has the tilt effect. The corrugated plate 32 is pressed against the end face of the cylindrical portion of the tilt bearing 31 by the tilt lock plate 33 so that a suitable torque will need to be generated when the LCD 7 is rotated about the axis 14.

Thereafter, as shown in FIG. 6, the mount hole 12c of the cover 12b is aligned with the screw hole 19e for screw engagement, and the cover 12b is fixed to the rotary member 19. A body cover 36 and a pressure plate 37 are then fixed, in that order, to the video camera body 2 by screws or the like.

At this time, a switch 38 on a printed board 38b is arranged so that a pressure piece 38a projects from windows 37a and 36a to the outside. The lead line for connecting the print board of the LCD 7 and the print board on the body 2 side is arranged to be inserted in the hole 33a of the tilt lock plate 33, the window 29c of the cover 29 and the window 19f of the rotary member 19 so that the LCD 7 and the video camera body 2 are electrically connected with each other.

As described above, the LCD 7 is openable through a range of 130°±5° in the horizontal direction relative to the video camera body 2. Also, the tilt rotation is possible through about 90°, respectively, in the clockwise direction and the counterclockwise direction about the axis 14 under the condition that the LCD 7 is opened.

Subsequently, as shown in FIGS. 2 and 5, a projection group 39 composed of small projections 39a in a matrix-type format is provided close to the opening/closing device 12 on the side surface of the video camera body 2 which is closed by the LCD 7. A setting switch group 40 is also provided on this side surface. The switches are setting switches such as, for example, MENU, EXECUTE, DATE, TIME, COUNTER or the like. The setting switch group 40 is covered by the LCD 7 when it is closed and therefore there is no fear that the setting switch group 40 will be accidentally touched during the image pickup operation using the EVF 6.

It is preferable that the setting switch group 40 is covered by the LCD 7, which is not used during a pickup operation with EVF 6 and is not exposed to the outside because the setting switch group 40 is not frequently used during either of the image pickup operation or reproduction.

Figure 14:
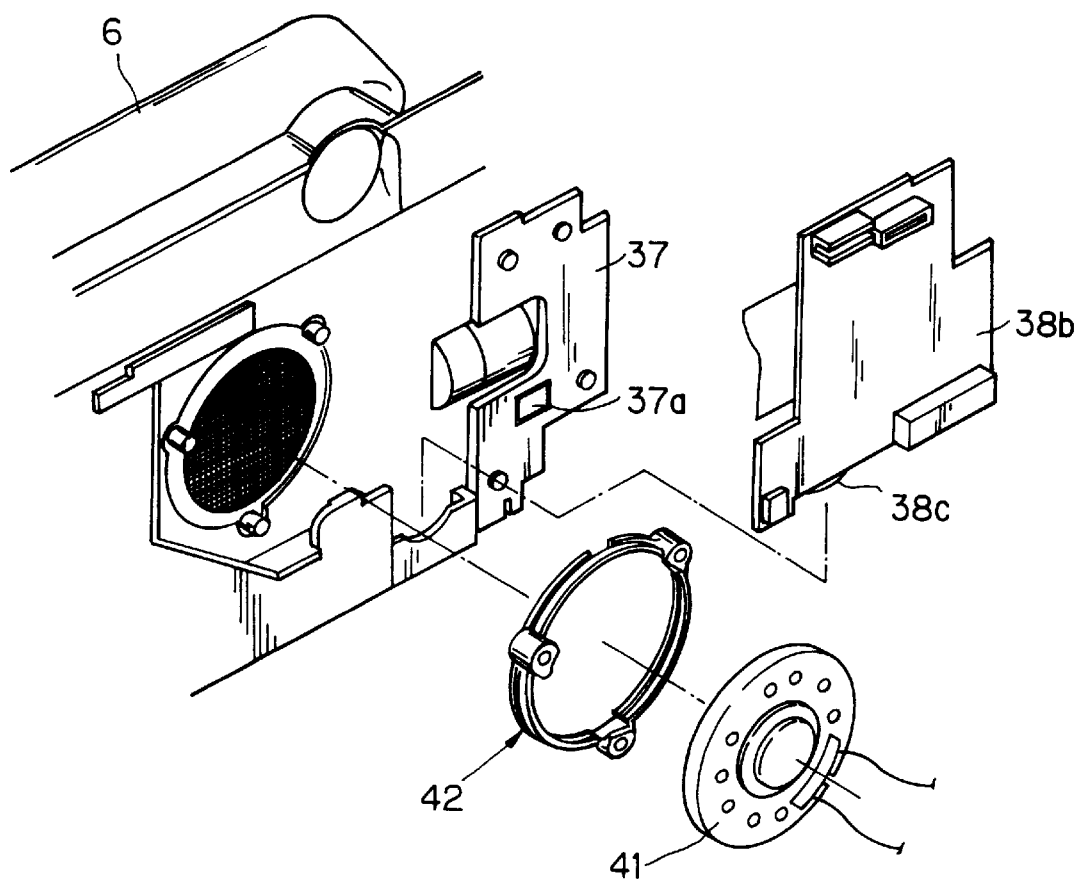
FIG. 14 is an exploded perspective view showing the speaker which is arranged in the interior of the body of the video camera in accordance with the present invention.

The speaker 41 is arranged inside a side surface of the video camera body 2 (see FIG. 14) it is mounted using a vibration-proof elastic member (for example, rubber) 42. The vibration-proof elastic member 42 is in turn fixed to the video camera body 2 by screws. A volume switch 38c for adjusting an audio output of the speaker 41 is provided near the end portion of the printed board 38b. A part of the volume switch 38c is exposed to the lower portion of the one side surface of the video camera body 2 (see FIG. 5). The circuit of the speaker 41 is designed so as to cooperate with the switching effect of the switch 38 so that the audio output is provided only when the LCD 7 is released from the one side surface of the video camera body 2 and the video tape is used for reproduction.

As described above, each structure of the video camera 1 according to the invention has been explained. Operation of the camera will now be explained.

In the case where the video camera 1 is used for picking up an image with EVF 6 or the reproduced image is viewed from the video tape, as shown in FIG. 1, the LCD 7 is kept closed against the one side surface of the body 2, and the image is picked up while being viewed through the finder EVF 6.

On the other hand, in the case where the image is picked up and the reproduced image of the video tape is viewed through the LCD 7, as shown in FIGS. 1 and 2, the lock release button 7a is depressed to release the lock. Then, the LCD 7 is moved to a desired angle about the vertical axis of the opening/closing device 12.

While the opening angle is with the range of 0° to 7°, the pressure projection 12a of the cover 12b is maintained in a state wherein the pressure projection 12a still presses the pressure piece 38a, and the EVF 6 is still rendered operative. However, when the opening angle of 7° is exceeded, the effect of the pressure piece 38a ceases and the switch 38 effects a switching operation so that the image signal is switched over from the EVF 6 to the LCD 7.

Figure 15:
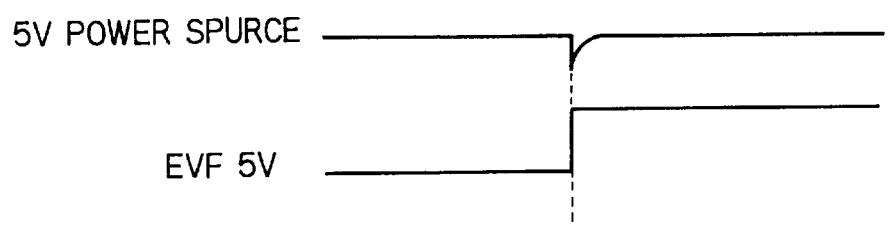
FIG. 15 is a timing chart showing noise generating conditions which occur when a view finder is turned on in a conventional video camera.

As described above, the reason why the switching-over of the image to the LCD 7 is not effected in response to a very small opening of the LCD 7 is to avoid the temporary inconvenience which might occur if the LCD 7 were to be erroneously released and to ensure that the switching-over is effected only in response to an opening degree clearly indicative that the user intends to use the LCD 7. During the switching-over operation between the two displays, if the switch 38 is permitted to induce the switch-over instantly as shown in FIG. 15, since the current from the power source is small, power is temporarily interrupted. As a result, noise is generated and introduced into the reproduced image field and recorded on the video tape during recording.

Figure 16:
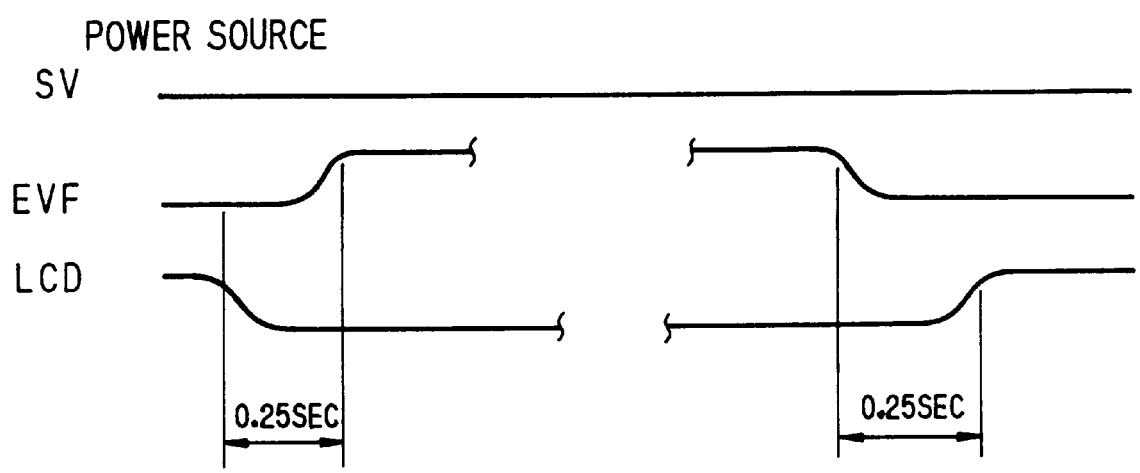
FIG. 16 is a timing chart illustrating the changeover characteristics which occur in accordance with the present invention, when the liquid crystal display is switched over to the view finder and vice versa.
Figure 17:
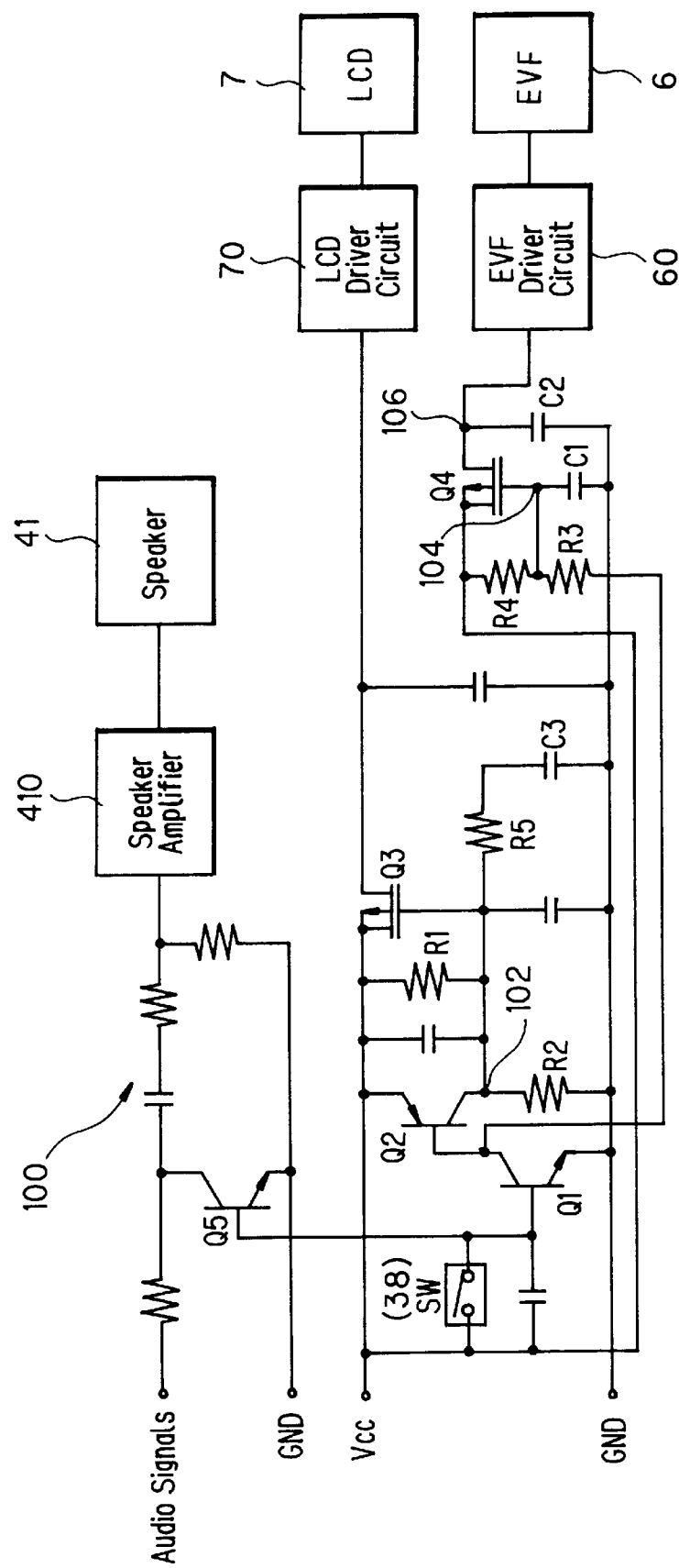
FIG. 17 is a circuit diagram showing an example of a circuit which may be used to establish an interconnection between the speaker, the LCD and the EVF.

In order to overcome this problem, the present invention provides, as shown graphically in FIG. 16 and schematically illustrated in circuit diagram form in FIG. 17, a plurality of C-R circuits which are combined with switching elements (field effect transistors or FETs) so that the rising times of the 5V electric power sources of the EVF 6 and the LCD 7 are delayed by the time constants to thereby prevent the generation of noise.

More specifically, as illustrated in FIG. 17, a circuit is provided which controls the operation of the EVF 6, the LCD 7 and a speaker 41. This circuit 100 is responsive to the switch 38, which is represented by SW in this diagram, in a manner wherein while the switch SW assumes closed (ON) state due to the liquid crystal display (LCD 7) being closed against the camera, a supply of the Vcc voltage to the base of an npn transistor Q1 is established and the npn transistor Q1 and a pnp transistor Q2 are rendered conductive (ON). Under these conditions, a field effect transistor FET Q3 is rendered non-conductive (OFF) as the conductivity of transistor Q1 lowers the voltage at terminal 102 to GND level. At the same time, as resistor R3 is connected with GND due to the conductivity of transistor Q1, the voltage appearing at terminal 104 rises to a high value and renders field effect transistor FET Q4 conductive (ON). Under these conditions, Vcc is supplied to the EVF Driver Circuit 60 and the EVF 6 is enabled. It will be noted that, due to the provision of a resistor R4 and a capacitor Cl, the rate at which the voltage at terminal 104 builds is smoothed and maintained at a low level for a sufficient period of time as to delay the switching of the FET Q4 from an OFF state to an ON state for a predetermined time. Following the FET Q4 being rendered conductive, the voltage appearing at terminal 106 increases as the capacitor C2 charges until it reaches Vcc level. The effect of resistor R4 and capacitors C1 and C2 is that following the switch SW being closed (ON), the switching ON of the FET Q4 is delayed and smoothed in a manner which provides a total delay of 0.25 sec in the manner depicted in FIG. 16. While the switch SW is closed (ON), the transistor Q5 is rendered conductive via the application of a Vcc voltage to its base. Under these conditions, the audio signals which are used to control the operation of the speaker 41 are short circuited to ground. This of courses renders the speaker 41 inoperative while the EVF 6 is in use.

On the other hand, in the event that the switch SW is open (OFF) in response to the display (LCD 7) being opened beyond the preset amount away from the camera body, the Vcc voltage is no longer applied to the base of transistor Q1 and thus induces the situation wherein transistors Q1 and Q2 are rendered non-conductive and resistor R3 is no longer grounded through the now non-conductive transistor Q1. The voltage appearing on terminal 104 therefore decreases smoothly to GND level in the manner depicted in FIG. 16. Simultaneously, the voltage appearing at terminal 102 rises in accordance with the transistor Q2 having been rendered non-conductive and the effect of resistor R5 and capacitor C3 permit. Viz., resistor R5 slows the charging of the capacitor C3 and therefore attenuates (smooths) the rate at which the voltage which is applied to the gate of the FET Q3 rises and therefore delays the FET Q3 being rendered conductive. When the switch SW is closed again (viz., rendered ON) by closure of the display (LCD 7) against the camera body 2, transistors Q1 and Q2 are rendered conductive and the voltage appearing on terminal 102 is permitted to fall to GND level. However, this reduction is buffered by capacitor discharge and falls to zero smoothly thus inducing the situation wherein the FET Q3 is rendered non-conductive without the generation of noise. At the same time, capacitor C1 begins to charge again and imitates the delay with which FET Q4 is rendered conductive.

Thus, as will be appreciated, in this instance, when the switch 38 is turned on, the 5V power to the LCD 7 is smoothly turned off (decreased from H to L), and subsequently, the 5V power source of the EVF 6 is smoothly turn on (increased from L to H). A period of time from the ON state of the switch 38 to the ON state of the EVF 6 is short (about 0.23 seconds), and is this essentially imperceptible to the operator but is sufficiently long as to prevent the generation of noise. Conversely, when the switch 38 is turned off, the 5V power source of the EVF 6 is smoothly turned off (H to L), and subsequently, the 5V power source of the LCD 7 is smoothly turned on (L to H).

Accordingly, there is no abrupt drop in the 5V power source, and a smooth switching is achieved while preventing the generation of the noise.

Thus, the image of the object is displayed on the large scale display image field 7c of the LCD 7 which has been released above the opening angle of 7° (in the range b) without generation of the noise and the view field is widened.

Also, since it is possible to tilt the LCD 7, it is possible to easily take a high angle shot or a low angle shot by tilting the LCD 7 suitably. In the case where the image field would be difficult to view due to strong ambient light levels such as sunshine, it is possible to effect an angle adjustment for better view.

Furthermore, when the pressure projection 12a is separated way from the pressure piece 38a by the opening of the LCD 7 so that the switch 38 is switched over, the output circuit of the speaker 41 is turned on together with the switching operation of the image field, and it is possible to output the audio signal.

Accordingly, it is possible to reproduce, for instance, the sound by adjusting the volume switch 38c of the speaker 41, and it is also possible for a number of people to simultaneously see and enjoy the reproduced image (playback) of the video tape at the site where it was recorded.

Even if the LCD 7 is opened to a maximum angle 130° and is further tilted, there is no fear that the corner portion of the LCD 7 would be brought into contact with the video camera body 2. Even if the LCD 7 is closed toward the video camera body 2 while it is being tilted and scratches or damages are generated, they are not remarkable because of the dimple-like nature of the projection group 39.

Furthermore, the projection group 39 is located where the left hand is positioned when the low angle pickup operation is effected and can act to stop slippage.

When the LCD 7 is released, or when it is tilted, a suitable rotational torque must be applied to overcome the effect of the corrugated plate 27 of the opening/closing device 12 and the corrugated plate 32 on the LCD 7 side. Accordingly, the open/tilted LCD 7 is maintained in the desired position.

When, the LCD 7 is closed to the one side surface of the video camera body 2, the pressure projection 12a of the opening/closing device 12 is brought into contact with the pressure piece 38a, and is further depressed to switch the switch 38 and cause the display of the image on the EVF 6.

Therefore, since the EVF 6 and the LCD 7 are switched over suitably, it is possible to save on power consumption while using the EVF 6 which is of the small power consumption type, and to prolong the time for which the battery is available.

Thus, according to the present invention, it is possible to provide a video camera 1 which is provided with a LCD 7 as well as the EVF 6 and in which the LCD 7 is openable and closable relative to the video camera body and has a tilt function to increase the view field which can be enjoyed by many persons.

As described above, since the video camera according to the present invention is provided with the liquid crystal display in addition to the viewfinder, the video camera is advantageous in that it is possible to easily confirm and pick up the object while viewing the large scale display field and it is possible for many persons to immediately enjoy a replay at the site where the image was recorded.

Since the liquid crystal display may display the image of the object and the reproduced image of the video tape, it is advantageously possible to view the object while viewing the large scale liquid crystal display image surface not only in reproduction of the video tape but also in taking the image of the object and it is possible to take the image of the object while confirming the background of the object as a whole.

Since the liquid crystal display is pivotally mounted on the video camera body, it is sufficient to simply open it when its use is desired. In case of use of the view finder, the liquid crystal display is also used as a cover. Accordingly, it is advantageous that the display portion is not exposed to the outside and there is no fear that it would be smudged with fingerprints or otherwise marked.

Since the display portion of the liquid crystal display is recessed from the face of the body of the liquid crystal display, the display portion does not directly contact the video camera body side when the body is closed and therefore may be prevented from being scratched or damaged.

The switching means are provided for switching over the images between the liquid crystal display and the view finder in response to the opening/closing operation of the liquid crystal display. Accordingly, it is advantageous that the image to be displayed is automatically and conveniently switched and battery power is conserved.

The switching means are interposed between the opening/closing device and the video camera body, and effect the switching operation simultaneously with the opening/closing operation of the opening/closing means. Thus, it is advantageous that the switching operation is performed in response to an opening degree sufficient to indicate a definite intention to use the LCD 7 in place of the viewfinder EVF 6.

Since the liquid crystal display is opened in the range of 130°±5° about the axis of the opening/closing means, the range where the image field is viewed is widened and it is possible for many persons to enjoy the image. It is also advantageous that even if the liquid crystal display is opened at the maximum level and the tilt effect is attained, there is no fear that any part of the liquid crystal display will be brought into contact with the video camera body.

Since the liquid crystal display is rotatable in a direction perpendicular to the axis of the opening/closing means by the rotating means interposed between the liquid crystal display and the opening/closing means, it is possible not only to make the display field tilted to avoid the reflection of the sunshine for easy view, but also to easily set the postures for a low angle shot or a high angle shot.

Since the above-described rotating means is structured so as to be rotatable through 90° in the clockwise direction and the counterclockwise direction, respectively, it is advantageous to cover the taking postures over the wide range. Also, if the limit to the rotational angle is increased to 180°, by displaying the video image in an up-and-down inverted manner through an electric circuit, it is possible to take the image of the operator himself or herself while viewing the display image.

Since the rotating means is provided with a click function by which the operator may feel the click when the liquid crystal display is rotated in the direction perpendicular to the axis of the opening/closing means, it is possible to perceive the tilt operation thus facilitating adjustment to the proper tilt.

Since the setting switch group is arranged on the side surface of the video camera body where the liquid crystal display is closed and contacted, it is advantageous that the setting switches which are not frequently used are protected by the cover of the liquid crystal display, and it is possible to provide a video camera in which a possibility of malfunction is low and the operation is stable.

Since the speaker for reproducing the video tape is arranged on the side surface of the video camera body to which the liquid crystal display is closed and contacted, it is advantageous that it is possible to enjoy the sound as well as the image in the reproduction mode.

Since the speaker is switched over by the switching means so as to output the sound through the electric connection only when the liquid crystal display is used, it is advantageous that the speaker automatically receives the sound output.

Since the projection group provided with the damage-proof treatment, even if the opened liquid crystal display is closed toward the body while tilted, there is no fear that scratches or the like would be remarkable and it is possible to maintain a quality of the article.

Since the lock means for maintaining the liquid crystal display closed is provided between the video camera body and the openable/closable liquid crystal display, it is possible to maintain the liquid crystal display in the closed condition without fail. It is advantageous that in carrying or handling the video camera, the liquid crystal display would not be accidentally opened due to bumping or the like.

It will be appreciated that the present invention is not limited to the arrangements which are illustrated in the drawings and which have been described above and that various modifications and changes may be made without departing from the scope of the present invention which is limited only by the appended claims.

What is claimed is:

1. A video camera comprising:
   a liquid crystal display for displaying an image; and
   a view finder for displaying an image;
   wherein said liquid crystal display is mounted on said video camera with a pivotal mounting so as to open and close against a side of said video camera;
   said camera further comprising a switch responsive to pivotal movement of the liquid crystal display for switching the image which is displayed between said liquid crystal display and said view finder.

2. A video camera as set forth in claim 1, wherein said liquid crystal display can display an image being recorded or an image reproduced from a video tape disposed in said video camera.

3. A video camera as set forth in claim 1, further comprising a display portion of said liquid crystal display, said display portion being recessed from a front surface of said liquid crystal display.

4. A video camera as set forth in claim 1, wherein said liquid crystal display is pivotal in an opening direction in a range of 130°±5° about an axis of said pivotal mounting.

5. A video camera as set forth in claim 1, further comprising a rotating means interposed between the liquid crystal display and said pivotal mounting, said rotating means allowing said liquid crystal display to rotate in a direction perpendicular to an axis of said pivotal mounting.

6. A video camera as set forth in claim 5, wherein, when said liquid crystal display is open, said rotating means allows said liquid crystal display to rotate in a clockwise direction and a counterclockwise direction by 90°, respectively.

7. A video camera as set forth in claim 6, wherein said rotating means include a detent means for providing a perceptible click when said liquid crystal display means is rotated.

8. A video camera as set forth in claim 1, further comprising a setting switch group disposed on a side surface of the video camera which is covered by the liquid crystal display when said liquid crystal display is closed.

9. A video camera as set forth in claim 1, further comprising a speaker for reproducing an audio signal from a video tape, said speaker being arranged on a side surface of the video camera body which is covered by said liquid crystal display when said liquid crystal display is closed.

10. A video camera as set forth in claim 9, wherein said speaker is electrically connected with a source of said audio signal by said switch so as to output sound only when said liquid crystal display is open.

11. A video camera as set forth in claim 1, further comprising a damage-resistant surface provided adjacent to the pivotal mounting on said side of the video camera which is covered by the liquid crystal display when said liquid crystal display is closed.

12. A video camera as set forth in claim 11, wherein said damage-resistant surface comprises a plurality of projections.

13. A video camera as set forth in claim 1, further comprising a locking means for maintaining said liquid crystal display in a closed condition, said locking means being provided between a body of said video camera and said liquid crystal display.

14. A video camera as set forth in claim 1, further comprising a connection for supply an image signal to said liquid crystal display, wherein said connection is governed by said switch and is enclosed in an interior portion of said pivotal mounting.

15. A video camera comprising:
   a camera body adapted to receive a tape cassette;
   an eyepiece type view finder, said viewfinder including a first liquid crystal display;
   a second liquid crystal display, larger than said first liquid crystal display, hingedly mounted on a side of said camera body, said second liquid crystal display being pivotal between a closed position and an open position; and
   switching means responsive to opening and closing of said second liquid crystal display for switching an image signal between said first liquid crystal display to said second liquid crystal display when said second liquid crystal display means is opened and closed.

16. A video camera as set forth in claim 15, further comprising a speaker, said speaker being enabled to produce an audio signal when said second liquid crystal display is opened by a predetermined amount from a fully closed position and disabled when said second liquid crystal display is not open more than said predetermined amount.

17. A video camera as set forth in claim 15, wherein said switching means switch said image signal between said first liquid crystal display and said second liquid crystal display when said second liquid crystal display is opened a predetermined amount.

18. A video camera as set forth in claim 17, wherein said predetermined amount is seven degrees.

19. A video camera as set forth in claim 15, further comprising a noise prevention circuit which prevents noise from being recorded on said tape cassette when said switching means switch said image signal between said first liquid crystal display and said second liquid crystal display.

* * * * *